US009779750B2

(12) United States Patent
Allen et al.

(10) Patent No.: US 9,779,750 B2
(45) **Date of Patent: *Oct. 3, 2017**

(54) CUE-AWARE PRIVACY FILTER FOR PARTICIPANTS IN PERSISTENT COMMUNICATIONS

(75) Inventors: Paul G. Allen, Seattle, WA (US); Edward K. Y. Jung, Bellevue, WA (US); Royce A. Levien, Lexington, MA (US); Mark A. Malamud, Seattle, WA (US); John D. Rinaldo, Jr., Bellevue, WA (US)

(73) Assignee: Invention Science Fund I, LLC, Bellevue, WA (US)

( * ) Notice: Subject to any disclaimer, the term of this patent is extended or adjusted under 35 U.S.C. 154(b) by 640 days.

This patent is subject to a terminal disclaimer.

(21) Appl. No.: 12/584,277

(22) Filed: Sep. 2, 2009

(65) Prior Publication Data

US 2010/0062754 A1 Mar. 11, 2010

Related U.S. Application Data

(63) Continuation-in-part of application No. 10/909,962, filed on Jul. 30, 2004.

(51) Int. Cl.
*H04M 3/00* (2006.01)
*G10L 21/00* (2013.01)
*G10L 21/013* (2013.01)

(52) U.S. Cl.
CPC ...... *G10L 21/00* (2013.01); *G10L 2021/0135* (2013.01)

(58) Field of Classification Search
CPC .... G06F 3/04883; G06F 3/017; G06F 3/0481; G06F 3/0488; G06F 2203/00; G10L 21/00; G10L 2021/0135
USPC ................................ 715/745, 789, 863, 864
See application file for complete search history.

(56) References Cited

U.S. PATENT DOCUMENTS

| | | | | |
|---|---|---|---|---|
| 4,531,228 | A | 7/1985 | Noso et al. | |
| 4,532,651 | A * | 7/1985 | Pennebaker, Jr. | G06T 3/40 382/261 |
| 4,757,541 | A | 7/1988 | Beadles | |
| 4,802,231 | A | 1/1989 | Davis | |
| 4,829,578 | A | 5/1989 | Roberts | |
| 4,952,931 | A | 8/1990 | Serageldin et al. | |
| 4,974,076 | A | 11/1990 | Nakamura et al. | |
| 5,001,556 | A | 3/1991 | Nakamura et al. | |
| 5,126,840 | A * | 6/1992 | Dufresne | H04N 7/173 348/E7.069 |
| 5,255,087 | A | 10/1993 | Nakamura et al. | |
| 5,278,889 | A | 1/1994 | Papanicolaou et al. | |

(Continued)

FOREIGN PATENT DOCUMENTS

| | | |
|---|---|---|
| WO | WO03058485 | 7/2003 |
| WO | PCT/US05/26428 | 2/2006 |

(Continued)

OTHER PUBLICATIONS

Coutaz et al. ("Early Experience with the mediaspace CoMedi" by Coutaz et. Al; pub data: 1999.*

(Continued)

*Primary Examiner* — Jung-Mu Chuang

(57) ABSTRACT

A cue, for example a facial expression or hand gesture, is identified, and a device communication is filtered according to the cue.

20 Claims, 5 Drawing Sheets

(56) References Cited

U.S. PATENT DOCUMENTS 5,288,938 A * 2/1994 Wheaton ............ G06K 9/00335 84/600
5,297,198 A * 3/1994 Butani .................. H04M 9/085 379/388.01
5,323,457 A * 6/1994 Ehara et al. ............. 379/392.01
5,386,210 A 1/1995 Lee
5,436,653 A 7/1995 Ellis et al.
5,511,003 A * 4/1996 Agarwal .................. H04N 7/15 348/E7.083
5,548,188 A 8/1996 Lee
5,550,924 A 8/1996 Helf et al.
5,617,508 A 4/1997 Reaves
5,666,426 A * 9/1997 Helms ...................... H03G 3/32 381/104
5,675,708 A 10/1997 Fitzpatrick et al.
5,764,852 A * 6/1998 Williams ...................... 704/243
5,880,731 A 3/1999 Liles et al.
5,918,222 A 6/1999 Fukui et al.
5,949,891 A * 9/1999 Wagner ..................... G06T 1/00 348/E7.082
5,966,440 A * 10/1999 Hair ....................... G06Q 20/12 360/15
5,983,369 A * 11/1999 Bakoglu ............. G06F 11/2294 714/25
6,037,986 A * 3/2000 Zhang .................... H04N 5/144 348/699
RE36,707 E 5/2000 Papanicolaou et al.
6,169,541 B1 * 1/2001 Smith .................. H04N 5/4401 348/564
6,184,937 B1 2/2001 Williams et al.
6,212,233 B1 4/2001 Alexandre et al.
6,243,683 B1 6/2001 Peters
6,259,381 B1 * 7/2001 Small ...................... F42C 13/00 340/988
6,262,734 B1 7/2001 Ishikawa
6,266,430 B1 7/2001 Rhoads
6,269,483 B1 * 7/2001 Broussard ..................... 725/143
6,285,154 B1 9/2001 Yasuda et al.
6,317,716 B1 11/2001 Braida et al.
6,317,776 B1 * 11/2001 Broussard et al. ........... 709/204
6,356,704 B1 * 3/2002 Callway ................. H04N 5/913 348/E7.061
6,377,680 B1 * 4/2002 Foladare et al. ......... 379/392.01
6,377,919 B1 4/2002 Burnett et al.
6,396,399 B1 5/2002 Dunlap
6,400,996 B1 6/2002 Hoffberg et al.
6,438,223 B1 8/2002 Eskafi et al.
6,473,137 B1 * 10/2002 Godwin ............... H04N 5/4401 348/725
6,483,532 B1 * 11/2002 Girod ..................... H04N 7/147 348/14.12
6,597,405 B1 7/2003 Iggulden
6,599,195 B1 7/2003 Araki et al.
6,611,281 B2 * 8/2003 Strubbe .................. H04N 7/142 348/14.01
6,617,980 B2 9/2003 Endo et al.
6,622,115 B1 9/2003 Brown et al.
6,690,883 B2 2/2004 Pelletier
6,720,949 B1 4/2004 Pryor et al.
6,724,862 B1 * 4/2004 Shaffer ............... H04M 1/6016 379/347
6,727,935 B1 4/2004 Allen et al.
6,749,505 B1 * 6/2004 Kunzle ................... A63F 13/10 463/23
6,751,446 B1 * 6/2004 Kim .................... H04M 1/0214 379/420.02
6,760,017 B1 7/2004 Banerjee et al.
6,771,316 B1 * 8/2004 Iggulden .................. H04N 5/44 348/460
6,775,835 B1 8/2004 Ahmad et al.
6,819,919 B1 11/2004 Tanaka
6,825,873 B2 11/2004 Nakamura et al.
6,829,582 B1 12/2004 Barsness
6,845,127 B2 * 1/2005 Koh ................. G08B 13/19634 348/155
6,882,971 B2 4/2005 Craner
6,950,796 B2 9/2005 Ma et al.
6,968,294 B2 * 11/2005 Gutta ................... A61B 5/7264 600/595
7,043,530 B2 5/2006 Isaacs et al.
7,110,951 B1 9/2006 Lemelson et al.
7,113,618 B2 9/2006 Junkins et al.
7,120,865 B1 10/2006 Horvitz et al.
7,120,880 B1 10/2006 Dryer et al.
7,129,927 B2 * 10/2006 Mattsson ...................... 345/158
7,149,686 B1 12/2006 Cohen et al.
7,162,532 B2 1/2007 Koehler et al.
7,203,635 B2 * 4/2007 Oliver .................. G06K 9/6293 345/156
7,203,911 B2 * 4/2007 Williams ................ G06F 3/011 345/158
7,209,757 B2 * 4/2007 Naghian ................ G01C 21/00 340/539.18
7,233,684 B2 6/2007 Fedorovskaya et al.
7,319,955 B2 * 1/2008 Deligne et al. ............... 704/233
RE40,054 E * 2/2008 Girod ..................... H04N 7/147 348/14.12
7,336,804 B2 2/2008 Steffin
7,379,568 B2 5/2008 Movellan et al.
7,409,639 B2 8/2008 Dempski et al.
7,418,116 B2 8/2008 Fedorovskaya et al.
7,424,098 B2 9/2008 Kovales et al.
7,472,063 B2 12/2008 Nefian et al.
7,496,272 B2 * 2/2009 DaSilva ................... H04N 5/76 386/291
7,587,069 B2 9/2009 Movellan et al.
7,624,076 B2 11/2009 Movellan et al.
7,634,533 B2 * 12/2009 Rudolph ............. H04L 12/1827 709/203
7,647,560 B2 1/2010 Macauley et al.
7,660,806 B2 2/2010 Brill et al.
7,664,637 B2 2/2010 Deligne et al.
7,680,302 B2 3/2010 Steffin
7,684,982 B2 * 3/2010 Taneda .......................... 704/233
7,689,413 B2 3/2010 Hershey et al.
7,768,543 B2 8/2010 Christiansen
7,860,718 B2 12/2010 Lee et al.
7,953,112 B2 5/2011 Hindus et al.
7,995,090 B2 8/2011 Liu et al.
8,009,966 B2 8/2011 Bloom et al.
8,132,110 B1 * 3/2012 Appelman ............ G06F 3/0482 715/710
8,416,806 B2 4/2013 Hindus et al.
8,571,853 B2 * 10/2013 Peleg ...................... G10L 17/26 704/201
8,578,439 B1 * 11/2013 Mathias ............. H04N 5/44582 725/141
8,599,266 B2 12/2013 Trivedi et al.
8,676,581 B2 3/2014 Flaks et al.
8,769,297 B2 * 7/2014 Rhoads ............. G06F 17/30017 380/51
8,977,250 B2 * 3/2015 Malamud ............. H04M 11/005 345/625
9,563,278 B2 2/2017 Xiang et al.
2001/0017910 A1 * 8/2001 Koh ................. G08B 13/19634 379/35
2001/0033666 A1 * 10/2001 Benz .................... G11B 27/028 381/119
2001/0042105 A1 * 11/2001 Koehler ................. H04H 20/04 709/217
2001/0049620 A1 * 12/2001 Blasko ................... G06Q 10/10 705/14.53
2002/0025026 A1 2/2002 Gerszberg et al.
2002/0025048 A1 * 2/2002 Gustafsson ........... G10L 19/012 381/61
2002/0028674 A1 3/2002 Slettengren et al.
2002/0097842 A1 * 7/2002 Guedalia et al. ............ 379/67.1
2002/0113757 A1 * 8/2002 Hoisko .............. H04N 1/32128 345/8
2002/0116196 A1 8/2002 Tran

(56) References Cited

U.S. PATENT DOCUMENTS

2002/0116197 A1* 8/2002 Erten ............................ 704/273
2002/0119802 A1* 8/2002 Hijii .................... H04M 1/0214 455/575.3
2002/0138587 A1* 9/2002 Koehler ................. H04H 20/04 709/207
2002/0150219 A1* 10/2002 Jorgenson ................ H04R 5/04 379/73
2002/0155844 A1 10/2002 Rankin et al.
2002/0161882 A1* 10/2002 Chatani ................... A63F 13/12 709/224
2002/0164013 A1 11/2002 Carter et al.
2002/0176585 A1 11/2002 Egelmeers et al.
2002/0180864 A1 12/2002 Nakamura et al.
2002/0184505 A1 12/2002 Mihcak et al.
2002/0191804 A1 12/2002 Luo et al.
2003/0005462 A1* 1/2003 Broadus et al. .............. 725/110
2003/0007648 A1* 1/2003 Currell ............................ 381/61
2003/0009248 A1* 1/2003 Wiser et al. .................... 700/94
2003/0023854 A1* 1/2003 Novak ............... H04N 7/17318 713/182
2003/0035553 A1 2/2003 Baumgarte et al.
2003/0041326 A1* 2/2003 Novak .............. H04L 29/06027 725/25
2003/0048880 A1 3/2003 Horvath et al.
2003/0076293 A1* 4/2003 Mattsson ...................... 345/156
2003/0088397 A1 5/2003 Karas et al.
2003/0090564 A1* 5/2003 Strubbe .................. H04N 7/142 348/14.01
2003/0093790 A1 5/2003 Logan et al.
2003/0117987 A1 6/2003 Brebner
2003/0153330 A1* 8/2003 Naghian ................ G01C 21/00 455/456.1
2003/0187657 A1* 10/2003 Erhart et al. ............... 704/270.1
2003/0202780 A1 10/2003 Dumm et al.
2003/0210800 A1* 11/2003 Yamada et al. ............... 381/310
2004/0006767 A1* 1/2004 Robson ................ H04N 7/0887 725/28
2004/0008423 A1* 1/2004 Driscoll, Jr. ........... G02B 13/06 359/725
2004/0012613 A1 1/2004 Rast
2004/0044777 A1 3/2004 Alkhatib et al.
2004/0049780 A1 3/2004 Gee
2004/0056857 A1 3/2004 Zhang et al.
2004/0101212 A1 5/2004 Fedorovskaya et al.
2004/0109023 A1 6/2004 Tsuchiya
2004/0125877 A1 7/2004 Chang et al.
2004/0127241 A1 7/2004 Shostak
2004/0143636 A1 7/2004 Horvitz et al.
2004/0148346 A1* 7/2004 Weaver ............... H04L 12/1822 709/204
2004/0193910 A1* 9/2004 Moles ..................... G06F 21/84 726/27
2004/0204135 A1 10/2004 Zhao et al.
2004/0205775 A1 10/2004 Heikes et al.
2004/0215731 A1 10/2004 Tzann-en Szeto
2004/0215732 A1 10/2004 McKee et al.
2004/0220812 A1 11/2004 Bellomo et al.
2004/0230659 A1* 11/2004 Chase ........................... 709/206
2004/0236836 A1 11/2004 Appleman et al.
2004/0243682 A1 12/2004 Markki et al.
2004/0252813 A1 12/2004 Rhemtulla et al.
2004/0261099 A1 12/2004 Durden et al.
2004/0263914 A1* 12/2004 Yule ........................ H04L 12/58 358/402
2005/0010637 A1* 1/2005 Dempski et al. ............. 709/204
2005/0018925 A1 1/2005 Bhagavatula et al.
2005/0028221 A1 2/2005 Liu et al.
2005/0037742 A1* 2/2005 Patton ............... H04M 1/72563 455/414.1
2005/0042591 A1 2/2005 Bloom et al.
2005/0053356 A1 3/2005 Mate et al.
2005/0064826 A1 3/2005 Bennetts et al.
2005/0073575 A1* 4/2005 Thacher ................. H04N 7/141 348/14.13
2005/0083248 A1 4/2005 Biocca et al.
2005/0113085 A1 5/2005 Giacopelli et al.
2005/0125500 A1* 6/2005 Wu ....................... H04L 12/581 709/207
2005/0131744 A1 6/2005 Brown et al.
2005/0262201 A1 11/2005 Rudolph et al.
2006/0004911 A1 1/2006 Becker et al.
2006/0015560 A1 1/2006 MacAuley et al.
2006/0025220 A1 2/2006 Macauley et al.
2006/0046707 A1* 3/2006 Malamud ............. H04M 11/005 455/420
2006/0056639 A1 3/2006 Ballas
2006/0187305 A1* 8/2006 Trivedi .............. G06K 9/00234 348/169
2006/0224382 A1* 10/2006 Taneda .................... G10L 15/25 704/233
2007/0038455 A1 2/2007 Murzina et al.
2007/0201731 A1 8/2007 Fedorovskaya et al.
2007/0203911 A1 8/2007 Chiu
2007/0211141 A1 9/2007 Christiansen
2007/0280290 A1 12/2007 Hindus et al.
2007/0288978 A1 12/2007 Pizzurro et al.
2008/0037840 A1 2/2008 Steinberg et al.
2008/0059530 A1 3/2008 Cohen et al.
2008/0192983 A1 8/2008 Steffin
2008/0235165 A1 9/2008 Movellan et al.
2008/0247598 A1 10/2008 Movellan et al.
2009/0147971 A1* 6/2009 Kuhr .................... H04R 1/1041 381/109
2009/0167839 A1* 7/2009 Ottmar ............... H04N 7/17318 348/14.08
2010/0124363 A1* 5/2010 Ek ........................... G06F 21/32 382/118
2011/0228039 A1 9/2011 Hindus et al.
2012/0007967 A1 1/2012 Kondo et al.
2012/0135787 A1* 5/2012 Kusunoki ........... H04M 1/0214 455/575.8
2012/0218385 A1 8/2012 Fujinami et al.
2013/0135297 A1 5/2013 Kobayashi et al.

FOREIGN PATENT DOCUMENTS

WO PCT/US05/29768 4/2006
WO PCT/US05/26429 2/2007

OTHER PUBLICATIONS

Ruggard, Peer; Safaty, Peter; "Mobile Control of Mobile Communications"; pp. 1-2; located at http://www-zorn.ira.uka.de/wave/abstract2.html; printed on Mar. 4, 2005.

* cited by examiner

CUE-AWARE PRIVACY FILTER FOR PARTICIPANTS IN PERSISTENT COMMUNICATIONS

CROSS-REFERENCE TO RELATED APPLICATIONS

The present application is related to and claims the benefit of earliest available effective filing date(s) from the following listed application(s) (the "Related Applications") (e.g., claims earliest available priority dates for other than provisional patent applications; claims benefits under 35 USC §119(e) for provisional patent applications), and incorporates by reference in its entirety all subject matter of the following listed application(s); the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith:

1. For purposes of the USPTO extra-statutory requirements, the present application constitutes a continuation-in-part of United States Patent Application entitled, CUE-AWARE PRIVACY FILTER FOR PARTICIPANTS IN PERSISTENT COMMUNICATIONS naming Edward K.Y. Jung; Royce A. Levien; Mark A. Malamud; John D. Rinaldo, Jr.; and Paul G. Allen as inventors, filed Jul. 30, 2004, application Ser. No. 10/909,962, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present Applicant has provided above a specific reference to the application(s)from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation of its parent applications as set forth above, but expressly points out that such designations are not to be construed in any way as any type of commentary and/or admission as to whether or not the present application contains any new matter in addition to the matter of its parent application(s).

All subject matter of the Related Application and of any and all parent, grandparent, great-grandparent, etc. applications of the Related Applications is incorporated herein by reference to the extent such subject matter is not inconsistent herewith.

TECHNICAL FIELD

The present disclosure relates to inter-device communication.

BACKGROUND

Modern communication devices are growing increasingly complex. Devices such as cell phones and laptop computers now often are equipped with cameras, microphones, and other sensors. Depending on the context of a communication (e.g. where the person using the device is located and to whom they are communicating, the date and time of day, among possible factors), it may not always be advantageous to communicate information collected by the device in its entirety, and/or unaltered.

SUMMARY

The following summary is intended to highlight and introduce some aspects of the disclosed embodiments, but not to limit the scope of the invention. Thereafter, a detailed description of illustrated embodiments is presented, which will permit one skilled in the relevant art to make and use aspects of the invention. One skilled in the relevant art can obtain a full appreciation of aspects of the invention from the subsequent detailed description, read together with the figures, and from the claims (which follow the detailed description).

A device communication is filtered according to an identified cue. The cue can include at least one of a facial expression, a hand gesture, or some other body movement. The cue can also include at least one of opening or closing a device, deforming a flexible surface of the device, altering an orientation of the device with respect to one or more objects of the environment, or sweeping a sensor of the device across the position of at least one object of the environment. Filtering may also take place according to identified aspects of a remote environment.

Filtering the device communication can include, when the device communication includes images/video, at least one of including a visual or audio effect in the device communication, such as blurring, de-saturating, color modification of, or snowing of one or more images communicated from the device. When the device communication includes audio, filtering the device communication comprises at least one of altering the tone of, altering the pitch of, altering the volume of, adding echo to, or adding reverb to audio information communicated from the device.

Filtering the device communication may include substituting image information of the device communication with predefined image information, such as substituting a background of a present location with a background of a different location. Filtering can also include substituting audio information of the device communication with predefined audio information, such as substituting at least one of a human voice or functional sound detected by the device with a different human voice or functional sound.

Filtering may also include removing information from the device communication, such as suppressing background sound information of the device communication, suppressing background image information of the device communication, removing a person's voice information from the device communication, removing an object from the background information of the device communication, and removing the image background from the device communication.

BRIEF DESCRIPTION OF THE DRAWINGS

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well known structures and functions have not been shown or described in detail to avoid unnecessarily obscuring the description of the embodiments of the invention. References to "one embodiment" or "an embodiment" do not necessarily refer to the same embodiment, although they may.

Figure 1:
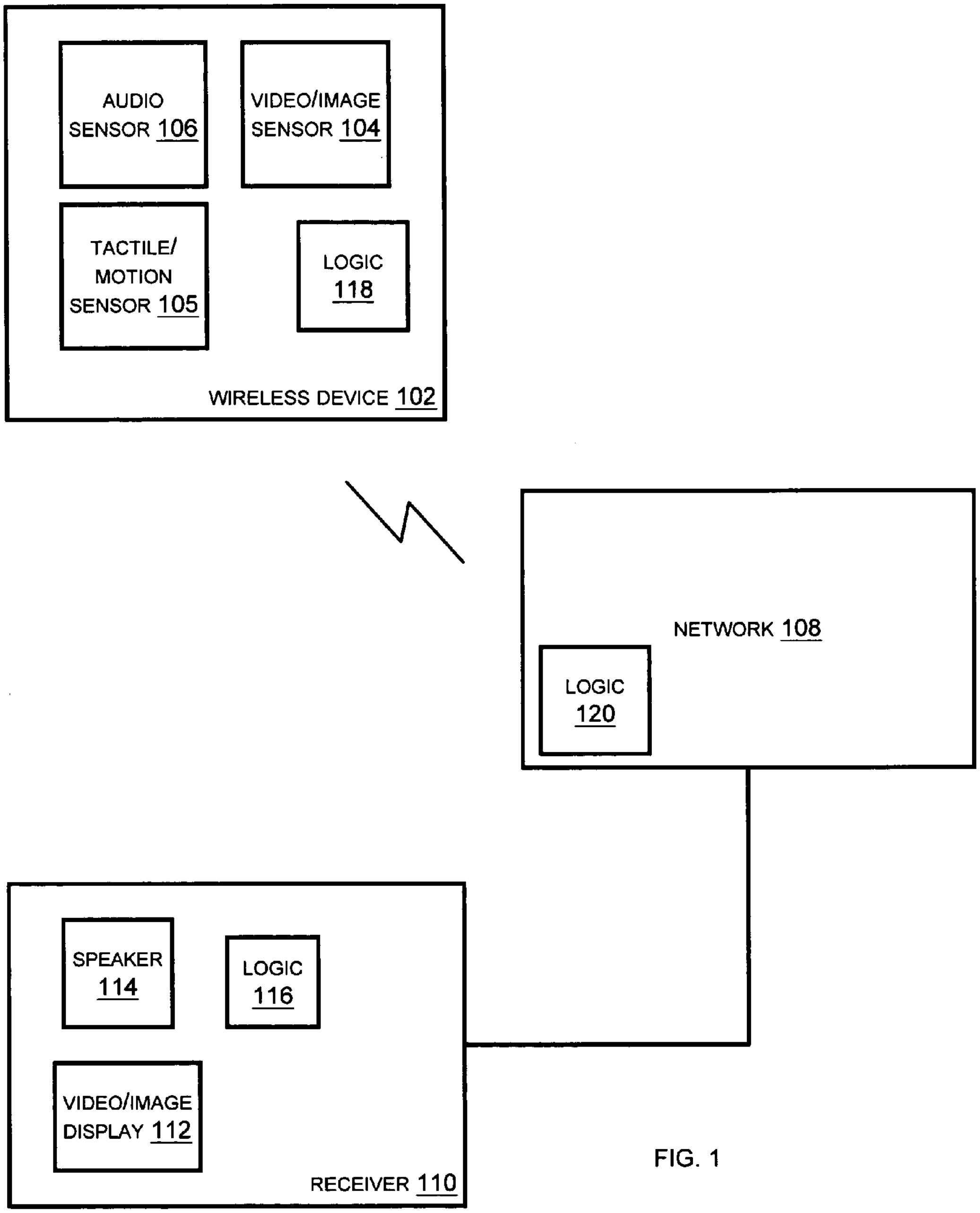
FIG. 1 is a block diagram of an embodiment of a device communication arrangement.

FIG. 1 is a block diagram of an embodiment of a device communication arrangement. A wireless device 102 comprises logic 118, a video/image sensor 104, an audio sensor 106, and a tactile/motion sensor 105. A video/image sensor (such as 104) comprises a transducer that converts light signals (e.g. a form of electromagnetic radiation) to electrical, optical, or other signals suitable for manipulation by logic. Once converted, these signals may be known as images or a video stream. An audio sensor (such as 106) comprises a transducer that converts sound waves (e.g. audio signals in their original form) to electrical, optical, or other signals suitable for manipulation by logic. Once converted, these signals may be known as an audio stream. A tactile/motion sensor (such as 105) comprises a transducer that converts contact events with the sensor, and/or motion of the sensor, to electrical, optical, or other signals suitable for manipulation by logic. Logic (such as 116, 118, and 120) comprises information represented in device memory that may be applied to affect the operation of a device. Software and firmware are examples of logic. Logic may also be embodied in circuits, and/or combinations of software and circuits.

The wireless device 102 communicates with a network 108, which comprises logic 120. As used herein, a network (such as 108) is comprised of a collection of devices that facilitate communication between other devices. The devices that communicate via a network may be referred to as network clients. A receiver 110 comprises a video/image display 112, a speaker 114, and logic 116. A speaker (such as 114) comprises a transducer that converts signals from a device (typically optical and/or electrical signals) to sound waves. A video/image display (such as 112) comprises a device to display information in the form of light signals. Examples are monitors, flat panels, liquid crystal devices, light emitting diodes, and televisions. The receiver 110 communicates with the network 108. Using the network 108, the wireless device 102 and the receiver 110 may communicate.

The device 102 or the network 108 identify a cue, either by using their logic or by receiving a cue identification from the device 102 user. Device 102 communication is filtered, either by the device 102 or the network 108, according to the cue. Cues can comprise conditions that occur in the local environment of the device 102, such as body movements, for example a facial expression or a hand gesture. Many more conditions or occurrences in the local environment can potentially be cues. Examples include opening or closing the device (e.g. opening or closing a phone), the deforming of a flexible surface of the device 102, altering of the device 102 orientation with respect to one or more objects of the environment, or sweeping a sensor of the device 102 across at least one object of the environment. The device 102, or user, or network 108 may identify a cue in the remote environment. The device 102 and/or network 108 may filter the device communication according to the cue and the remote environment. The local environment comprises those people, things, sounds, and other phenomenon that affect the sensors of the device 102. In the context of this figure, the remote environment comprises those people, things, sounds, and other signals, conditions or items that affect the sensors of or are otherwise important in the context of the receiver 110.

The device 102 or network 108 may monitor an audio stream, which forms at least part of the communication of the device 102, for at least one pattern (the cue). A pattern is a particular configuration of information to which other information, in this case the audio stream, may be compared. When the at least one pattern is detected in the audio stream, the device 102 communication is filtered in a manner associated with the pattern. Detecting a pattern can include detecting a specific sound. Detecting the pattern can include detecting at least one characteristic of an audio stream, for example, detecting whether the audio stream is subject to copyright protection.

The device 102 or network 108 may monitor a video stream, which forms at least part of a communication of the device 102, for at least one pattern (the cue). When the at least one pattern is detected in the video stream, the device 102 communication is filtered in a manner associated with the pattern. Detecting the pattern can include detecting a specific image. Detecting the pattern can include detecting at least one characteristic of the video stream, for example, detecting whether the video stream is subject to copyright protection.

Figure 2:
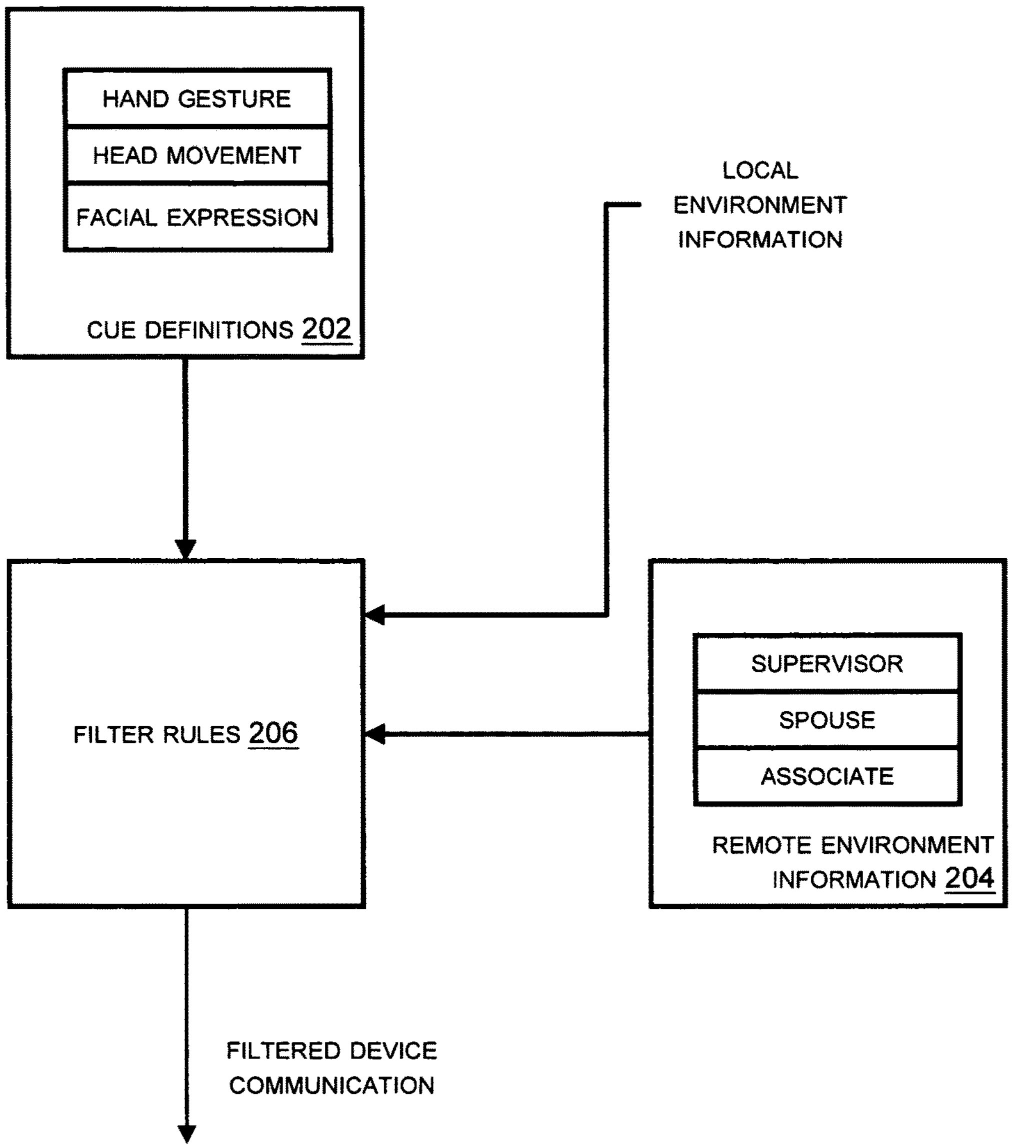
FIG. 2 is a block diagram of an embodiment of an arrangement to produce filtered device communications.

FIG. 2 is a block diagram of an embodiment of an arrangement to produce filtered device communications. Cue definitions 202 comprise hand gestures, head movements, and facial expressions. In the context of this figure, the remote environment information 204 comprise a supervisor, spouse, and associates. The filter rules 206 define operations to apply to the device communications and the conditions under which those operations are to be applied. The filter rules 206 in conjunction with at least one of the cue definitions 202 are applied to the local environment information to produce filtered device communications. Optionally, a remote environment definition 204 may be applied to the filter rules 206, to determine at least in part the filter rules 206 applied to the local environment information.

Filtering can include modifying the device communication to incorporate a visual or audio effect. Examples of visual effects include blurring, de-saturating, color modification of, or snowing of one or more images communicated from the device. Examples of audio effects include altering the tone of, altering the pitch of, altering the volume of, adding echo to, or adding reverb to audio information communicated from the device.

Filtering can include removing (e.g. suppressing) or substituting (e.g. replacing) information from the device communication. Examples of information that may suppressed as a result of filtering include the background sounds, the background image, a background video, a person's voice, and the image and/or sounds associated with an object within the image or video background. Examples of information that may be replaced as a result of filtering include background sound information which is replaced with potentially different sound information and background video information which is replaced with potentially different video information. Multiple filtering operations may occur; for example, background audio and video may both be suppressed by filtering. Filtering can also result in application of one or more effects and removal of part of the communication information and substitution of part of the communication information.

Figure 3:
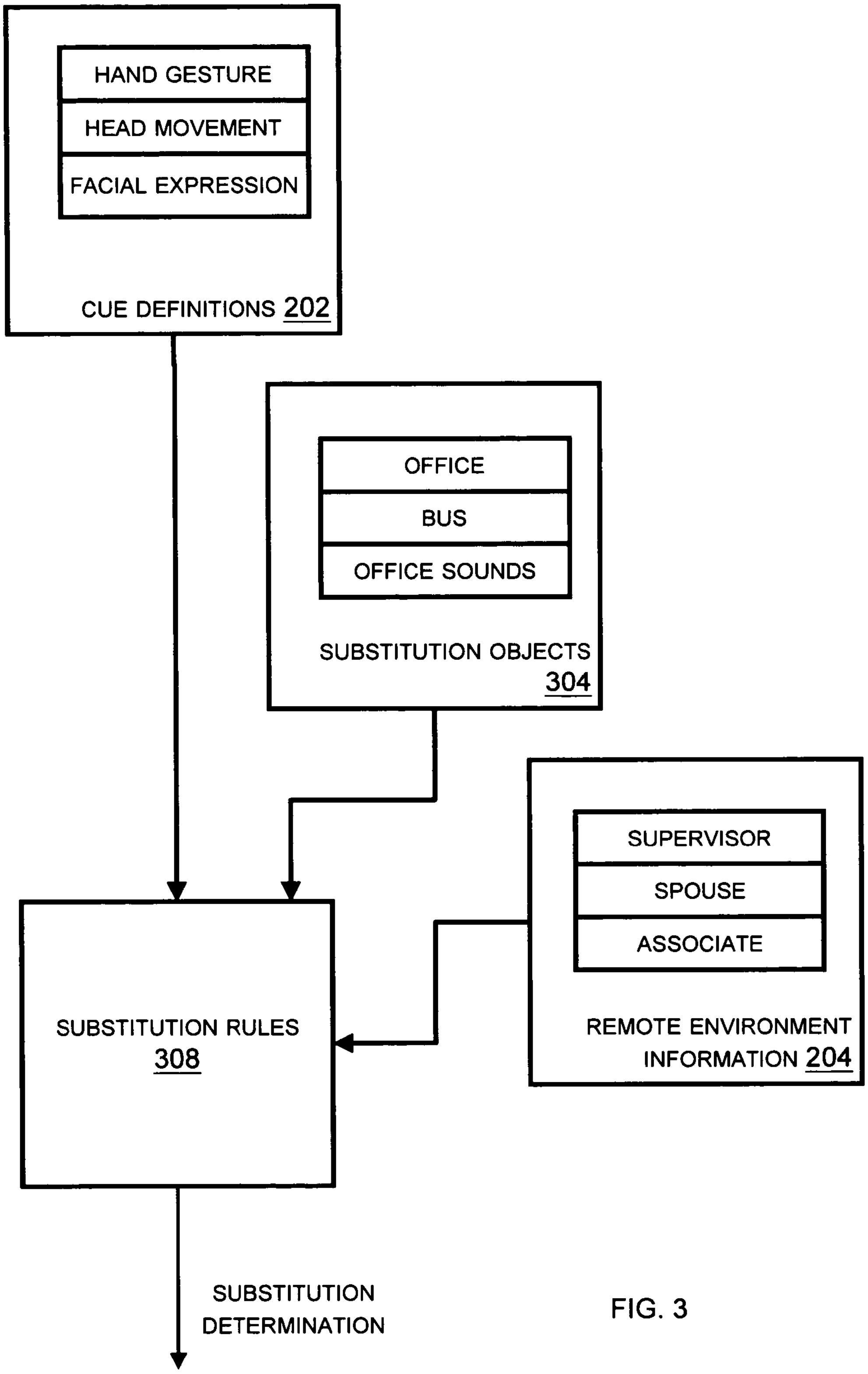
FIG. 3 is a block diagram of another embodiment of a device communication arrangement.

FIG. 3 is a block diagram of another embodiment of a device communication arrangement. The substitution objects 304 comprise office, bus, and office sounds. The substitution objects 304 are applied to the substitution rules 308 along with the cue definitions 202 and, optionally, the remote environment information 204. Accordingly, the substitution rules 308 produce a substitution determination for the device communication. The substitution determination may result in filtering.

Filtering can include substituting image information of the device communication with predefined image information. An example of image information substitution is the substituting a background of a present location with a background of a different location, e.g. substituting the office background for the local environment background when the local environment is a bar.

Filtering can include substituting audio information of the device communication with predefined audio information. An example of audio information substitution is the substituting at least one of a human voice or functional sound detected by the device with a different human voice or functional sound, e.g. the substitution of bar background noise (the local environment background noise) with tasteful classical music.

Figure 4:
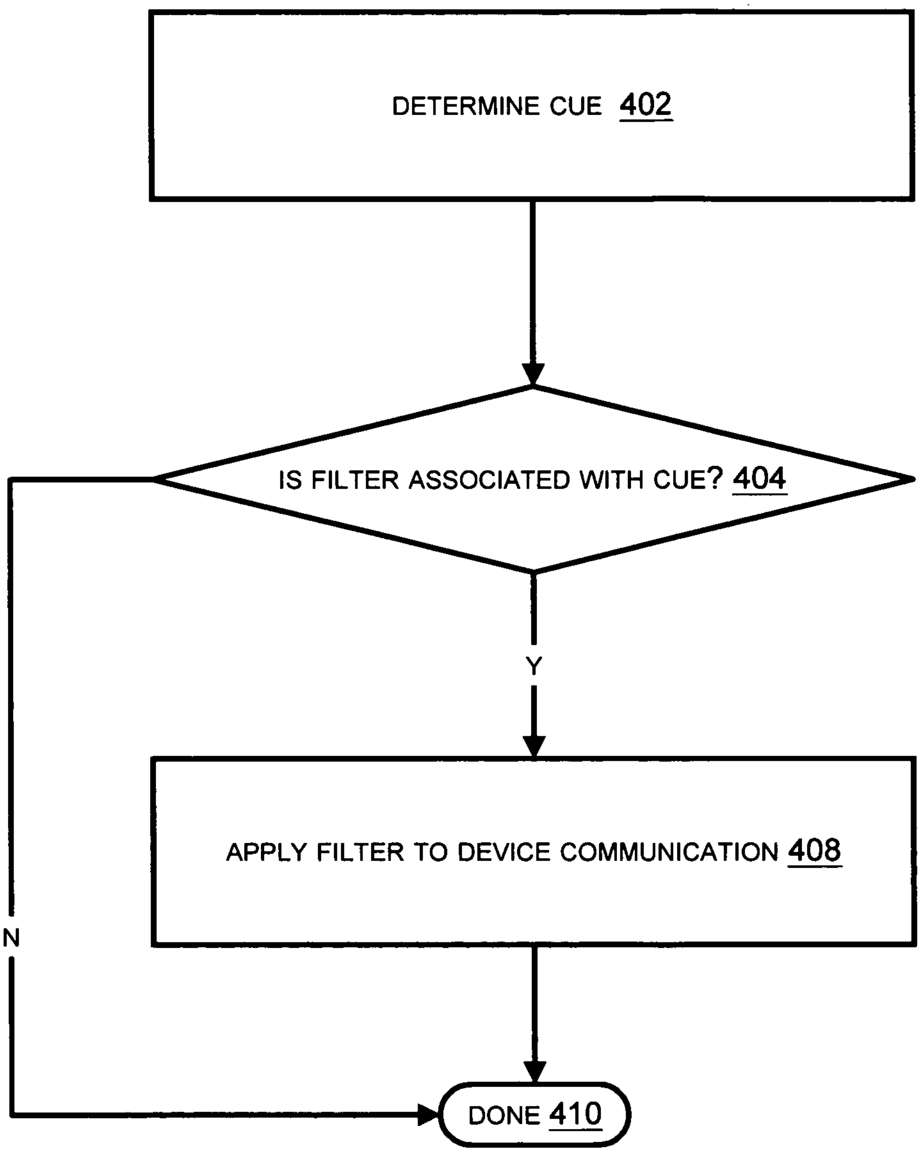
FIG. 4 is a flow chart of an embodiment of a method of filtering device communications according to a cue.

FIG. 4 is a flow chart of an embodiment of a method of filtering device communications according to a cue. At 402 it is determined that there is a cue. If at 404 it is determined that no filter is associated with the cue, the process concludes. If at 404 it is determined that a filter is associated with the cue, the filter is applied to device communication at 408. At 410 the process concludes.

Figure 5:
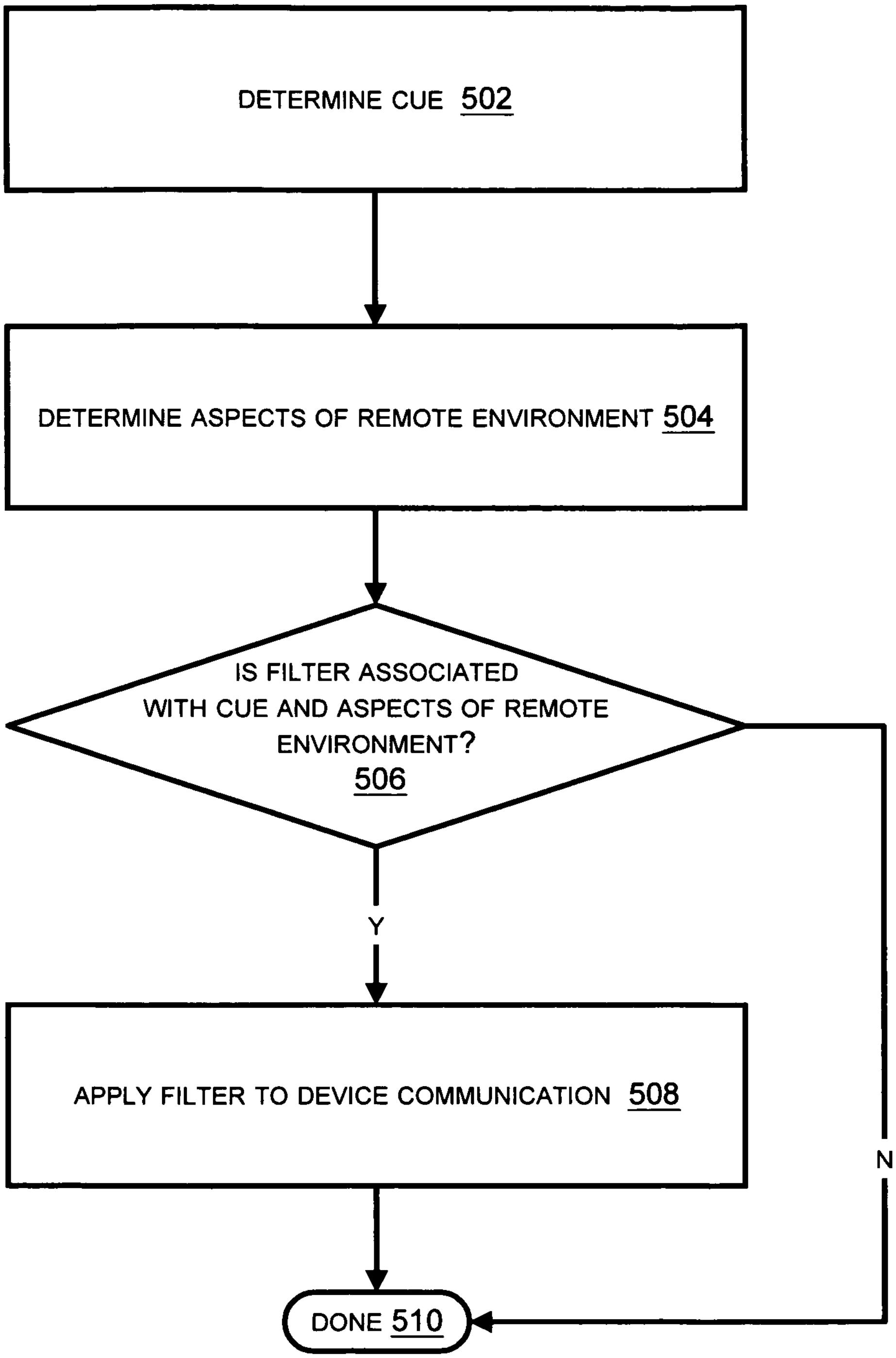
FIG. 5 is a flow chart of an embodiment of a method of filtering device communications according to a cue and a remote environment.

FIG. 5 is a flow chart of an embodiment of a method of filtering device communications according to a cue and a remote environment. At 502 it is determined that there is a cue. At 504 at least one aspect of the remote environment is determined. If at 506 it is determined that no filter is associated with the cue and with at least one remote environment aspect, the process concludes. If at 506 it is determined that a filter is associated with the cue and with at least one remote environment aspect, the filter is applied to device communication at 508. At 510 the process concludes.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

What is claimed is:

1. A communication system-implemented method comprising:

operating at least one communication device including at least communicating, via synchronous communication, at least one of audio information or video information between at least one local environment and at least one remote environment;

sensing at least one of audible or visual local environment information in the at least one local environment;

obtaining remote environment information including one or more of at least one identifier of at least one participant in the at least one synchronous communication in the remote environment or at least one contextual aspect of the remote environment;

identifying at least one cue occurring in at least one of the at least one local environment or the at least one remote environment, wherein the at least one cue includes at least one manipulation of at least one communication device including at least one of opening of the at least one communication device, closing of the at least one communication device, deforming a flexible surface of the at least one communication device, or altering an orientation of the at least one communication device;

determining one or more filter rules based at least partly on the at least one of audible or visual local environment information and the remote environment information responsive to the at least one cue; and filtering, using one or more processing components, at least one portion of synchronously communicated at least one of audio information or video information according to the one or more filter rules responsive to the at least one cue.

2. A system comprising:

one or more communication devices including at least one electronic device, the at least one electronic device including at least:

circuitry configured for communicating, via synchronous communication, at least one of audio information or video information between at least one local environment and at least one remote environment;

circuitry configured for sensing at least one of audible or visual local environment information in the at least one local environment;

circuitry configured for obtaining remote environment information including one or more of at least one identifier of at least one participant in the at least one synchronous communication in the remote environment or at least one contextual aspect of the remote environment;

circuitry configured for identifying at least one cue occurring in at least one of the at least one local environment or the at least one remote environment, wherein the at least one cue includes at least one manipulation of at least one communication device including at least one of opening of the at least one communication device, closing of the at least one communication device, deforming a flexible surface of the at least one communication device, or altering an orientation of the at least one communication device;

circuitry configured for determining one or more filter rules based at least partly on the at least one of audible or visual local environment information and the remote environment information responsive to the at least one cue; and circuitry configured for filtering at least one portion of synchronously communicated at least one of audio information or video information according to the one or more filter rules responsive to the at least one cue.

3. The system of claim 1, wherein the circuitry configured for identifying at least one cue occurring in at least one of the at least one local environment or the at least one remote environment includes:

circuitry configured for identifying at least one cue including one or more of a facial expression, a verbal or nonverbal sound, a hand gesture, sweeping a sensor of at least one communication device, or a body movement.

4. The system of claim 2, wherein one or more communication devices in the at least one remote environment that receive synchronously communicated at least one of audio information or video information from the at least one local environment include:

at least one of a cell phone, a wireless device, a computer, a video/image display, or a speaker.

5. The system of claim 1, wherein the circuitry configured for filtering at least one portion of synchronously communicated at least one of audio information or video information according to the one or more filter rules responsive to the at least one cue includes:

at least one of:

circuitry configured for (i) substituting at least one sound information associated with the at least one portion of synchronously communicated at least one of audio information or video communication with at least one different sound information and (ii) including at least one audio effect in the at least one portion of synchronously communicated at least one of audio information or video communication, at least partly in response to the at least one cue;

circuitry configured for (i) substituting at least one sound information associated with the at least one portion of synchronously communicated at least one of audio information or video communication with at least one different sound information and (ii) altering tone, pitch, or volume of at least some of the at least one portion of synchronously communicated at least one of audio information or video communication, at least partly in response to the at least one cue;

circuitry configured for substituting at least one sound information associated with the at least one portion of synchronously communicated at least one of audio information or video communication with at least one different predefined sound information at least partly in response to the at least one cue;

circuitry configured for substituting at least one human voice or functional sound information associated with the at least one portion of synchronously communicated at least one of audio information or video communication with at least one different human voice or functional sound information at least partly in response to the at least one cue;

circuitry configured for (i) substituting at least one sound information associated with the at least one portion of synchronously communicated at least one of audio information or video communication with at least one different sound information and (ii) removing information from at least some of the at least one portion of synchronously communicated at least one of audio information or video communication, at least partly in response to the at least one cue;

circuitry configured for (i) substituting at least one sound information associated with the at least one portion of synchronously communicated at least one of audio information or video communication with at least one different sound information and (ii) removing at least one voice from the at least one portion of synchronously communicated at least one of audio information or video communication, at least partly in response to the at least one cue;

circuitry configured for substituting at least one background sound information associated with the at least one portion of synchronously communicated at least one of audio information or video communication with at least one different background sound information at least partly in response to the at least one cue; or circuitry configured for substituting at least one voice associated with the at least one portion of synchronously communicated at least one of audio information or video communication with at least one different voice at least partly in response to the at least one cue.

6. The system of claim 1, wherein the circuitry configured for identifying at least one cue occurring in at least one of the at least one local environment or the at least one remote environment includes:

at least one of:

circuitry configured for monitoring at least one portion of synchronously communicated at least one of audio information or video communication for at least one pattern; or circuitry configured for detecting whether at least one portion of the at least one of synchronously communicated at least one of audio information or video communication is subject to copyright protection.

7. The system of claim 1, wherein the circuitry configured for identifying at least one cue occurring in at least one of the at least one local environment or the at least one remote environment includes:

circuitry configured for detecting at least one specific sound in the at least one of synchronously communicated at least one of audio information or video communication.

8. The system of claim 1, wherein the one or more communication devices include:

circuitry configured for identifying at least one hand gesture cue;

circuitry configured for determining at least one substitution rule based at least partly on the at least one identified hand gesture cue; and circuitry configured for substituting at least one functional object background sound information associated with the at least one portion of synchronously communicated at least one of audio information or video communication with at least one different sound information based at least partly on the at least one substitution rule determined based at least partly on the at least one identified hand gesture cue.

9. The system of claim 8, wherein the circuitry configured for substituting at least one functional object background sound information associated with the at least one portion of synchronously communicated at least one of audio information or video communication with at least one different sound information based at least partly on the at least one substitution rule determined based at least partly on the at least one identified hand gesture cue includes:

circuitry configured for substituting at least one functional object background sound information associated with the at least one portion of synchronously communicated at least one of audio information or video communication with at least one different sound information based at least partly on the at least one substitution rule determined based at least partly on the at least one identified hand gesture cue and based at least partly on at least one aspect of at least one remote environment associated with the at least one of synchronously communicated at least one of audio information or video communication.

10. The system of claim 2, wherein the one or more communication devices include:

at least one of a cell phone or a computer in the at least one local environment configured for communicating with the at least one receiver in the remote environment, the at least one of a cell phone, a wireless device, or a computer further including at least one of a camera or a microphone configured to sense at least one visual or audio condition occurring in the at least one local environment.

11. The system of claim 2, wherein the one or more communication devices include:

at least one sensor configured to sense at least one condition occurring in at least one of the at least one local environment or the at least one remote environment.

12. The system of claim 2, wherein the one or more communication devices include:

circuitry configured for determining at least one aspect of the at least one remote environment; and circuitry configured for filtering, at one or more communication devices in the at least one local environment or at least one network device, at least part of synchronous communication of at least one of audio information or video information transmitted from the at least one local environment wherein at least one aspect of filtering is based at least partly on the determined at least one aspect of the at least one remote environment.

13. The system of claim 2, wherein the circuitry configured for identifying at least one cue occurring in at least one of the at least one local environment or the at least one remote environment includes:

at least one of:

circuitry configured to monitor at least on audio stream which forms at least part of the at least one of synchronously communicated at least one of audio information or video communication for at least one pattern indicative of the at least one cue; or circuitry configured to monitor at least on video stream which forms at least part of the at least one of synchronously communicated at least one of audio information or video communication for at least one pattern indicative of the at least one cue.

14. The system of claim 2, wherein the circuitry configured for filtering at least one portion of synchronously communicated at least one of audio information or video information according to the one or more filter rules responsive to the at least one cue includes:

circuitry configured for filtering, at one or more communication devices in the at least one local environment or at least one network device, at least part of local environment information wherein at least one aspect of filtering is based at least partly on participants in synchronous communication of at least one of audio information or video information.

15. The system of claim 2, wherein the circuitry configured for filtering at least one portion of synchronously communicated at least one of audio information or video information according to the one or more filter rules responsive to the at least one cue comprises:

at least one of:

circuitry configured for filtering at least one audio stream communicated from the at least one local environment to the at least one remote environment based at least partly on at least one sensor-detected environmental aspect of the at least one remote environment, the filtering of the audio stream including at least one of altering tone, altering pitch, altering volume, adding echo, or adding reverb; or circuitry configured for filtering at least one video stream communicated from the at least one local environment to the at least one remote environment based at least partly on at least one sensor-detected environmental aspect of the at least one remote environment, the filtering of the video stream including at least one of blurring, de-saturating, color modification, or snowing of one or more images in the at least one video stream.

16. The system of claim 2, wherein the one or more communication devices include:

at least one of a wireless device or a network device.

17. The system of claim 2, wherein the circuitry configured for filtering at least one portion of synchronously communicated at least one of audio information or video information according to the one or more filter rules responsive to the at least one cue includes:

at least one of circuitry configured for filtering at least one portion of synchronously communicated at least one of audio information or video information according to the one or more filter rules responsive to the at least one cue, the filtering based at least partly on at least one video or image sensor-detected environmental aspect indicative of video or images of at least one of people or things in the at least one remote environment;

circuitry configured for filtering at least one portion of synchronously communicated at least one of audio information or video information according to the one or more filter rules responsive to the at least one cue, the filtering based at least partly on at least one audio sensor-detected environmental aspect indicative of sounds of at least one of people or things in the at least one remote environment; or circuitry configured for filtering at least one portion of synchronously communicated at least one of audio information or video information according to the one or more filter rules responsive to the at least one cue, the filtering based at least partly on at least one tactile or motion sensor-detected environmental aspect indicative of tactile or motion of at least one of people, things, or sounds in the at least one remote environment.

18. The system of claim 2, wherein the circuitry configured for communicating, via synchronous communication, at least one of audio information or video information between at least one local environment and at least one remote environment includes:

circuitry configured for communicating at least one telephone communication between at least one local environment and at least one remote environment.

19. The system of claim 2, wherein the circuitry configured for communicating, via synchronous communication, at least one of audio information or video information between at least one local environment and at least one remote environment includes:

circuitry configured for communicating at least one audio-visual communication between at least one local environment and at least one remote environment.

20. A wireless device comprising:

at least one data processing circuit; and circuitry at least partly in the at least one data processing circuit that when applied to the at least one data processing circuit results in the wireless device:

communicating, via synchronous communication, at least one of audio information or video information between at least one local environment and at least one remote environment;

sensing at least one of audible or visual local environment information in the at least one local environment;

obtaining remote environment information including one or more of at least one identifier of at least one participant in the at least one synchronous communication in the remote environment or at least one contextual aspect of the remote environment;

identifying at least one cue occurring in at least one of the at least one local environment or the at least one remote environment, wherein the at least one cue includes at least one manipulation of at least one communication device including at least one of opening of the at least one communication device, closing of the at least one communication device, deforming a flexible surface of the at least one communication device, or altering an orientation of the at least one communication device;

determining one or more filter rules based at least partly on the at least one of audible or visual local environment information and the remote environment information responsive to the at least one cue; and filtering at least one portion of synchronously communicated at least one of audio information or video information according to the one or more filter rules responsive to the at least one cue.

* * * * *